March 22, 1927. 1,621,652
O. U. BEAN
METHOD OF PRODUCING GAS
Filed March 24, 1925      5 Sheets-Sheet 1
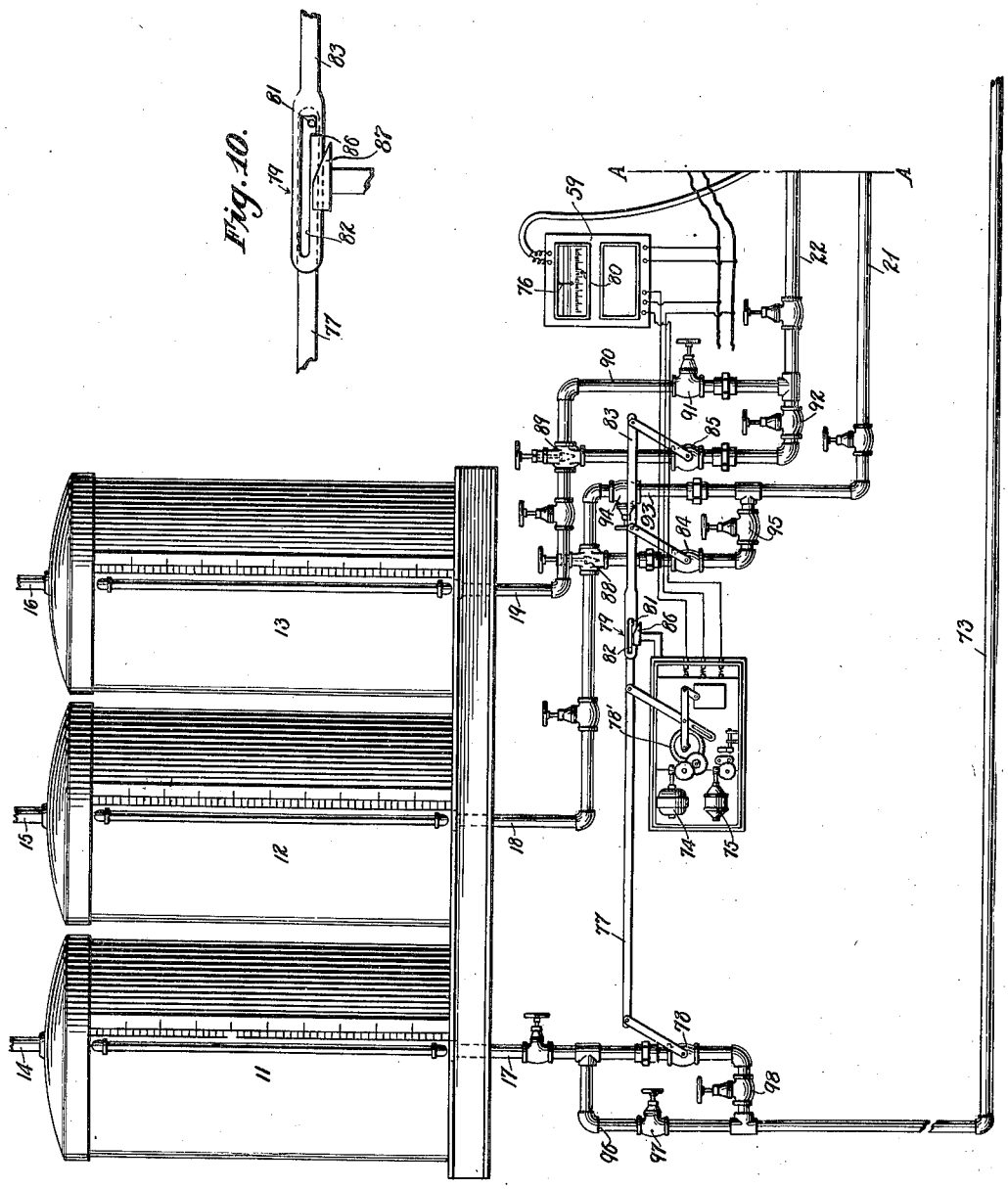
Inventor
*Orestes U. Bean*
By *Brown & Phelps*
Attorneys

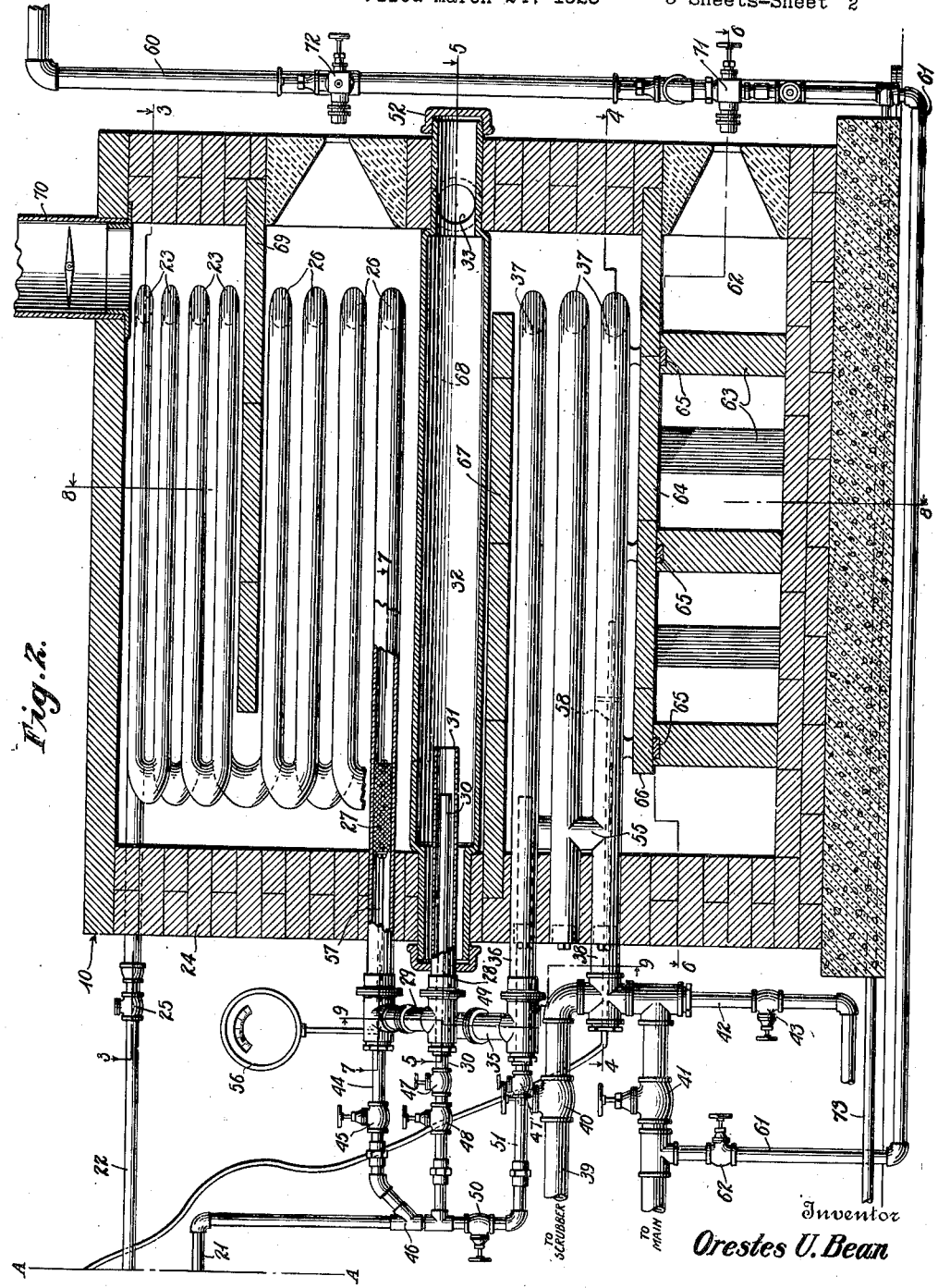

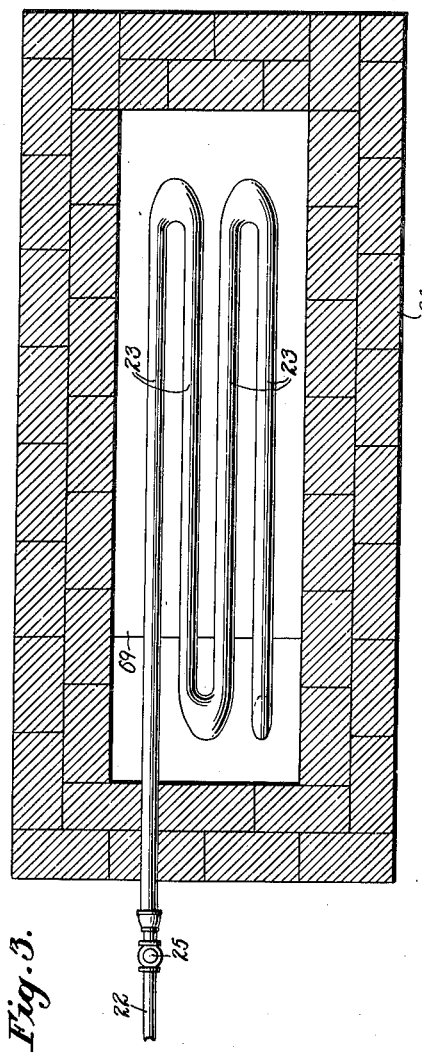
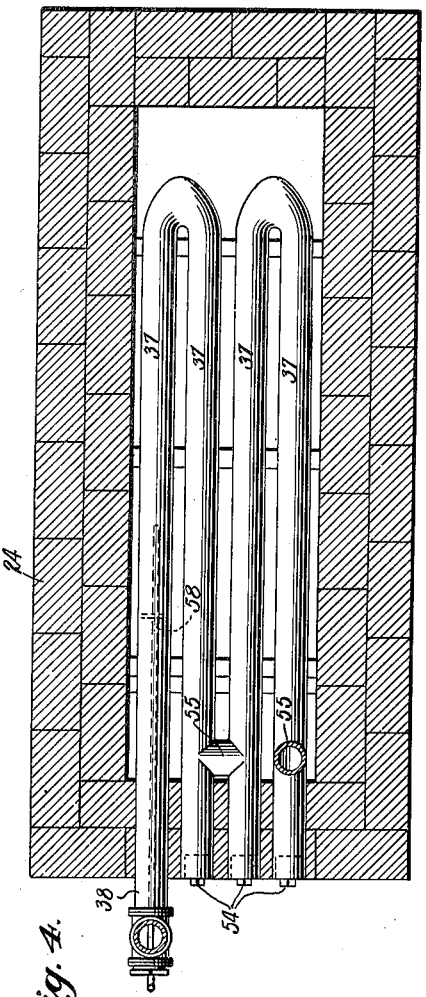

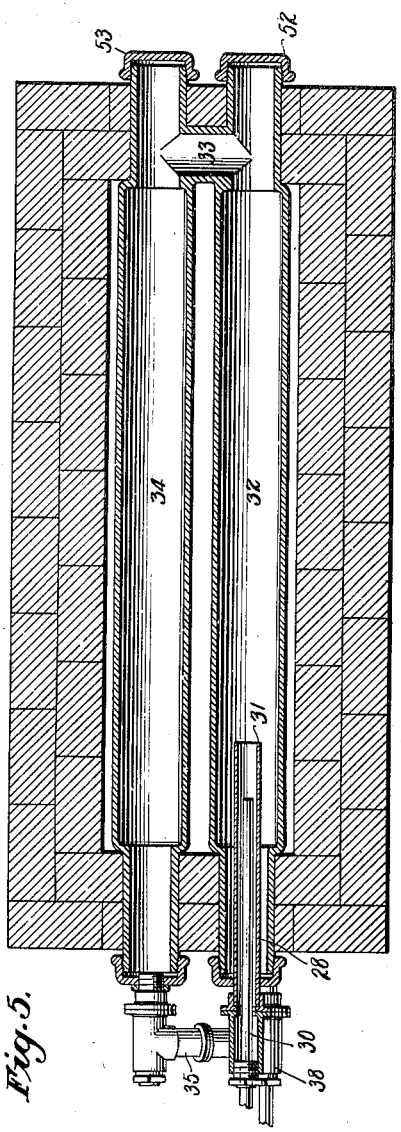
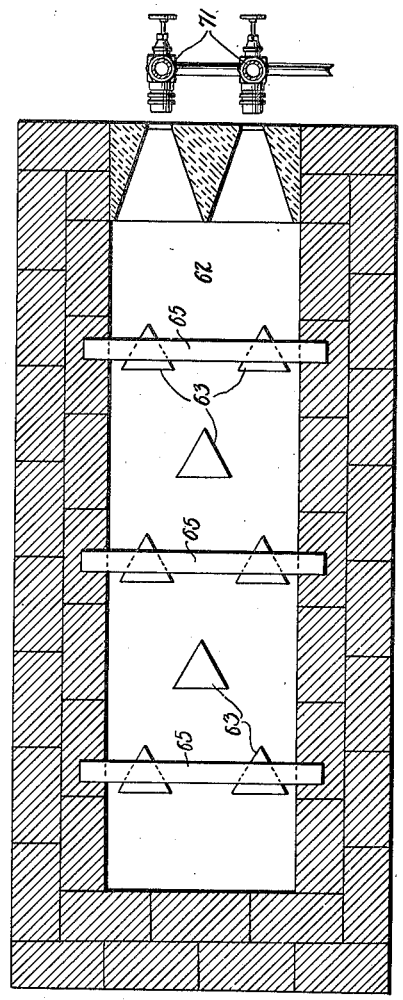

March 22, 1927.
O. U. BEAN
1,621,652
METHOD OF PRODUCING GAS
Filed March 24, 1925     5 Sheets-Sheet 5
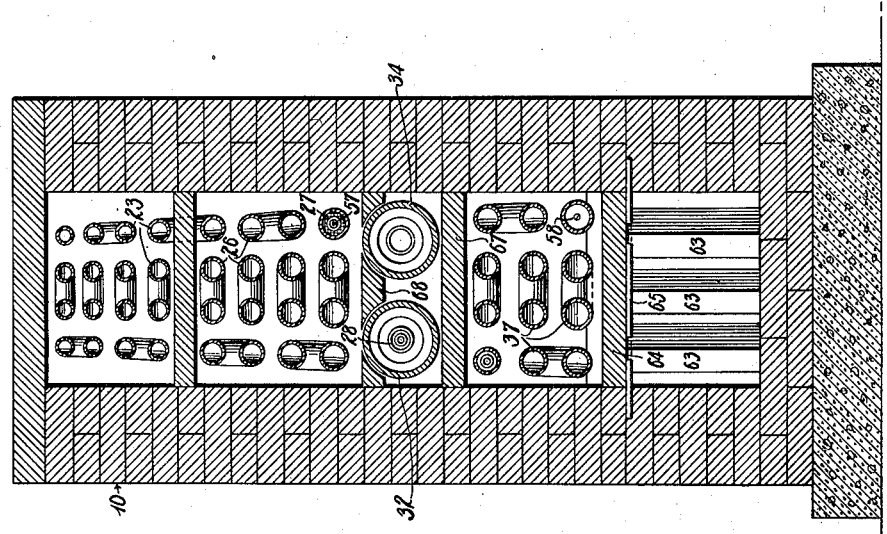
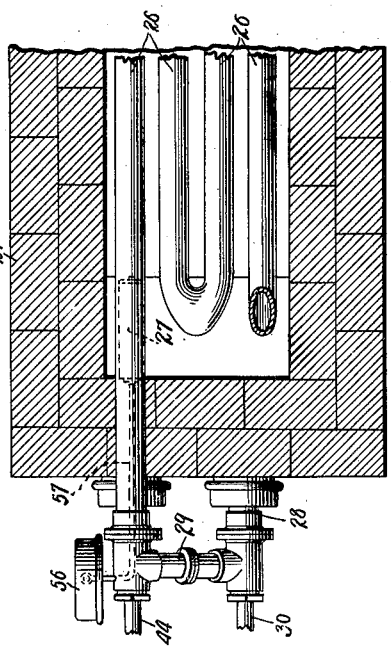
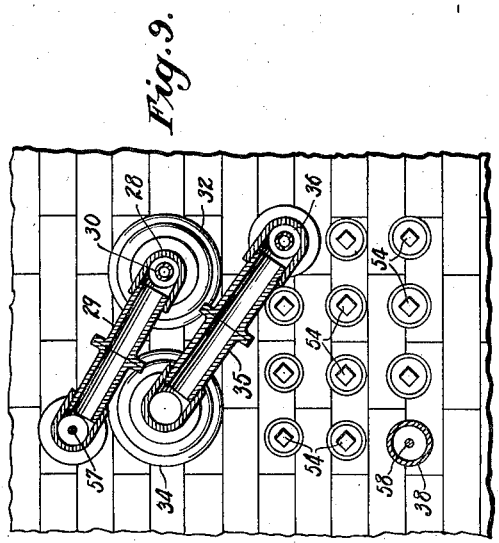
Inventor
*Orestes U. Bean*
By *Brown & Phelps*
Attorneys Patented Mar. 22, 1927.

1,621,652

UNITED STATES PATENT OFFICE.

ORESTES U. BEAN, OF NEW YORK, N. Y., ASSIGNOR TO BEAN PROCESS SYNDICATE, INCORPORATED, A CORPORATION OF DELAWARE.

METHOD OF PRODUCING GAS.

Application filed March 24, 1925. Serial No. 18,024.

The invention relates to the method of and apparatus for producing gas.

It is an object of the invention to provide a method of producing a gas which might not be incorrectly termed an artificial natural gas, from water, steam, or gas, and hydrocarbon.

It is a further object of the invention to provide a method of producing gas from a hydrocarbon of the cheapest and what is ordinarily considered the poorest quality, and generally waste or by-product matter.

It is a further object of the invention to produce a gas from materials which have previously been dehydrogenated such as are termed in the art "still bottom", "topped oils", or tars, tar oils from coal, and water, steam or gas.

It is a further object of the invention to provide a method for producing a gas which may be stored indefinitely without changing to liquid form.

It is a further object of the invention to produce a gas from water, steam, or gas, and hydrocarbon from which liquid hydrocarbons carrying valuable by-products of a volatile nature may be recovered by known methods.

It is a further object of the invention to provide a method for producing gas from hydrocarbon and water, steam or gas, which method enables the operator to control the character of the gas produced so as to increase or diminish the B. t. u. value thereof and vary the constituents and recoverable by-products thereof at will.

It is a further object of the invention to provide a method of producing a gas carrying free oxygen, and which I call oxy-hydrocarbon gas; meaning, thereby, a hydrocarbon gas having free oxygen mixed therewith.

It is a further object of the invention to provide a method of producing an artifical gas superior to natural gas from which, as a by-product, helium and non-inflammable gases of high specific gravity may be recovered and also oxygen.

It is a further object of the invention to provide apparatus for carrying out the method of the invention, which apparatus may be substantially automatic and shall be continuous in action.

It is a further object of the invention to provide an apparatus which, by proper manipulation of temperature and feed of materials thereof, will produce a carbon black.

Further objects of the invention will appear from the following description read in connection with the accompanying drawings, showing an illustrative embodiment of the invention and wherein, Figs. 1 and 2, when placed in continuous relation from left to right, represent a side elevation partly in elevation and partly in vertical longitudinal section;

Figs. 3, 4, 5, and 6 are horizontal sections on the corresponding section lines of Fig. 2;

Fig. 7 is a detail horizontal section on line 7—7 of Fig. 2;

Fig. 8 is a vertical transverse section on line 8—8 of Fig. 2;

Fig. 9 is a detail vertical section on line 9—9 of Fig. 2; and

Fig. 10 is a detail elevation partly in section showing a lost-motion device.

As shown, the device comprises a gas generator 10, shown in vertical section in Fig. 2, and material tanks 11, 12, and 13, shown in Fig. 1, together with supply pipes and means for controlling the supply of material and fuel to the generator.

The contents of the tanks 11, 12, and 13 are designed to be forced therefrom to the point of use by means of gravity or pressure supplied thereto by means, not shown, through the pipes 14, 15, and 16, and the feed pipes 17, 18, 19.

The tank 11 is designed to hold a liquid or gaseous fuel, which may be of the nature utilized for the hydrocarbon in the gas production or any other desirable liquid or gaseous fuel. In lieu of such fuel, waste heat from my own other processes may be utilized in whole or in part.

The pipe 17 is in communication with a pipe 73, which conducts fuel to the burners 71—72.

The tank 12 is provided to hold a supply of the hydrocarbon, which, with the water from tank 13, is to be utilized in the production of gas. Steam or gas may be used in lieu of water if and when deemed advisable. The hydrocarbon from the pipe 18 is led to the pipe 21 and fed to the gas producing apparatus in a manner to be described.

The water from the tank 13 is led from the pipe 19, by means of the pipe 22, to the gas-producing apparatus, and the steam or gas may be likewise led to pipe 22 or as may be otherwise conveniently provided.

The apparatus illustrated in Fig. 2 comprises a means for changing the water into steam, for superheating the steam, for dissociating the superheated steam into its chemical elements, for mixing these chemical elements with hydrocarbon and by means of the heat of the mixed hydrogen and oxygen and added heat, the cracking and vaporizing of the hydrocarbon, the intimate mixing of the vaporized hydrocarbon and the hydrogen and oxygen, the subjection of the mixture to alternate expansion and reduction in volume, and the continued raising of the temperature of the thus formed mixture until the temperature of gas fixation for making a permanent gas is attained.

The water, steam, or gas, enters the steam-producing coils 23 in the upper portion of the generator tubing 24, a check valve 25 being provided to prevent any back pressure produced by the too sudden generation of steam in the coils. Such back pressure is further prevented by the fact that the coils gradually increase in size from beginning to end. The water, when used, will have been changed to steam in the coils 23, and is then superheated in the coils 26, which are also illustrated as gradually increasing in size.

Adjacent the end of the coils 26 there is shown a catalyzer 27, for which purpose it is preferred to utilize nickel wire screen, although other substances may be utilized, including all members of the platina family.

The superheated steam passing through the catalyzer 27 has been raised to a temperature of dissociation or from substantially 700° F. to 800° F., and at this temperature, may be brought into contact with the catalyzer, whereby the steam is dissociated into its constituent elements, hydrogen and oxygen. These gases are then passed to the sleeve 28 through the connecting conduit 29.

The hydrocarbon supplied through the pipe 21 is passed to the apparatus 10, through the pipe 30, concentric with the sleeve 28, and is therefore immediately affected by the high temperatures of the hydrogen and oxygen therein, and travels for a short distance in the pipe 30, surrounded by these products, whereupon the termination of the pipe 30 allows the heated hydrocarbon to suddenly expand and the hydrogen and oxygen and hydrocarbon to become mixed, emerging from the end 31 of the sleeve 28 into a cylinder or retort 32, of considerably larger diameter than the said sleeve, the mixture thus provided is permitted to again suddenly expand and is then passed through the highly heated cylinder 32, and flows through a restricted passage 33 in altered juxtaposition, each element to the others, to the cylinder or retort 34, of substantially the same diameter as the cylinder 32, wherein the mixture of materials referred to again expands and its temperature is further raised. The mixture of products of dissociation and hydrocarbon vapors in cylinders 32 and 34 is raised to a temperature of substantially 1000° to 1100° F.

From the cylinder 34 the heated mixture passes by a conduit 35, preferably of substantially smaller diameter than the cylinder, to a pipe 36, which is the beginning of a series of coils 37. In these coils the temperature is increased to substantially 1150° to 1250° F., at which temperature the carbon has an affinity for hydrogen but not for oxygen, and such formations as $C_2H_4$, $C_2H_6$, $C_3H_8$, $C_4H_{10}$, $CH_4$, $C_2H_2$, $C_7H_8$, $C_6H_6$, and numerous others are formed accompanied by free hydrogen and oxygen before the mixture reaches the outlet 38 in a permanent fixed gaseous state typical simple analyses of said gas being as follows: $CO_2$ 2%, illuminants 45.3%, $O_2$ 1.7%, CO 0.5%, $H_2$ 8.0%, $CH_4$ 37.5% undefined 5.0%; also: $CH_2$ 0.8%, illuminants 28.9%, $O_2$ 1.0%, CO 0.7%, $H_2$ 21.0%, $CH_4$ 45.2%, undefined 1.4%.

Some of the hydrogen of the dissociated water will remain free and some will have been taken up by the hydrocarbon to produce gases, which, in their nature, may be liquefied by known methods. The character of the gas, its B. t. u. value, and the amount and character of the liquid hydrocarbon recoverable may be influenced by variation of the amounts and character of hydrocarbon utilized and of water supplied through the pipes 21 and 22, and by regulated variation of the temperatures within the apparatus.

From the outlet 38, the gas may be led to any form of scrubber, wash-box, hydraulic main or the like, for removal of free oxygen content by absorption and for purification through the pipe 39, or by closing the valve 40 and opening the valve 41 the gas may be taken in its form as produced with attendant free oxygen to a gas main, from which it may be utilized in its already heated condition for any desired purpose. If desired, a cooling coil may be connected in the conduit leading to the gas main, which coil may be externally cooled in any feasible manner.

The oxygen of the dissociated steam is found to be present in the gas as it proceeds from the outlet 38, and may be removed by absorption by the water in the scrubber, washbox or hydraulic main, since the solubility of the oxygen is many times that of the hydrocarbon gas produced, and the oxygen thus removed may be recovered as a by-product by vacuum or otherwise.

To provide a drainage, if necessary, from the outlet pipe 38, an outlet pipe 42 is shown controlled by a valve 43.

As a hydrocarbon material from which to produce the gas in connection with water, steam or gas, the material known to the trade as "still bottom" may be used. Other materials which may be utilized are oils and tars from coke oven gas, oil distillates carrying free carbon and residuum from low temperature distillation coal gas plants, from carburetted water gas plants, and, residuums from substances found in gas tar pools, and the like.

The pressure placed upon the tank 12 is usually sufficient to feed this material to the pipe 21, but to make the same sufficiently fluid to thoroughly mix with the hydrogen and oxygen in the pipe 28, its temperature may be raised. To this end, a pipe 44 is shown controlled by a valve 45, through which a portion of the heated hydrogen and oxygen may be allowed to escape into the pipe 21 and which enters the same at an angle by virtue of the Y 46.

A check valve is shown at 47 to prevent back pressures from the cylinder 32 and a similar valve 47' is shown in pipe 51.

In the event of an accident to the cylinder 32, or for other reason, the valve 48 may be closed, fitting 49 may be removed, and the pipe 28 capped or tee-plugged, and the valve 50 may be opened, allowing the gases from the decomposition of the water to join the hydrocarbon and to flow by means of the pipe 51 direct to the coils 37. For emergency, or from choice, a gas may be produced in this manner.

The cylinders 32—34 are shown as provided with caps 52—53 by removal of which, access may be had to the interior of the cylinders to clean them, if necessary.

One end of each of the pipes composing the coil 37 is shown as terminating in a plug 54 (when preferably made in this manner), by removal of which, access to the interior thereof may be had for cleaning purposes and for recovery of carbon black or other by-products. This construction also admits of temperature distribution checking by various placing of pyrometer rods.

The connections between the consecutive pipes making up the coil 37 are shown in the form of conduits 55, which may be welded to the walls of the longitudinal tubes, except when the return bend type of tubes as in coils 23 and 26 be the preferred construction of apparatus.

To enable the temperature at the point of dissociation of the water to be determined, a pyrometer index 56 is shown controlled by means of a pyrometer rod 57. To provide a reading of the temperature at the terminal end of the coils 37, a pyrometer index 59 is provided, which connects with a pyrometer rod 58 which pyrometer is an element in an automatic controlling device to be described.

To heat the apparatus, the burners 71 and 72 are provided, which burners may be supplied with a liquid hydrocarbon fuel from the tank 11 by means of the pipe 17, or from an external source of gas supply by means of a pipe 60, or the burners may be supplied by hot gas from the outlet 38 by means of a pipe 61 controlled by a valve 62. Waste heat may also be used in lieu of fuel in plants where such is available.

The burners 71 are shown as projecting into a combustion chamber 62, provided preferably with triangular baffles 63 shown in section in Fig. 6, and roofed by means of a slab 64, of refractory material, having supports 65 supported between the baffles 63. The slab 64, terminating at 66, allows the heated products of combustion of the burners 71 access to the coils 37, a baffle 67 providing that these products of combustion shall traverse the length of the coils when they are passed around the cylinders 32—34.

A baffle 68 causes the products of combustion to traverse the length of the cylinders when they are delivered to the steam superheating coils 26 at the point of dissociation thereof, by means of or after passing the catalyzer 27, the said products passing directly upward through the ends of the coils 26 about a baffle 69 traversing coils 23 to the stack 70.

To provide additional temperature for superheating of the steam, the burner 72 is provided, the flame from which impinges directly upon the coils 26, passing under the baffle 69, joining the products of combustion of the burners 71, and therewith passing longitudinally of the coils 23 to the stack 70.

To control the supply of fuel gas, hydrocarbon gas, hydrocarbon and water, to the apparatus, the apparatus shown in Fig. 1 may be utilized. As there shown, are two electric motors 74 and 75, which motors are under control of the pyrometer 59. Since the pyrometer and its control of the motors 74—75 form no part of my invention except as relating to an automatically operating gas making method and apparatus the showing thereof is entirely diagrammatic.

When the temperature in the apparatus rises higher than required as indicated at the pyrometer index 59, the movable pointer 80 of the pyrometer makes a contact which sets motor 74 into operation, and through gearing 78' and the link 77 the valve 78 is partially or completely closed, the motor 74 automatically stopping after completion of one revolution of the gear 78, thus reducing the supply of fuel to the burners.

Because of a lost-motion device at 79, this operation will not affect the supply of gas-making materials. When the temperature in the apparatus falls sufficiently the point 76 will make a contact, setting the motor 75 into operation, causing the link 77 to move in the opposite direction to open the valve 78. If the drop in temperature in the apparatus is sufficiently great or continues, continuous operation of the motor 75 will cause the lost motion in the device 79 to be exhausted when a pin 81 will abut against the end of a slot 82, whereupon the link 83 will close the valves 84—85 to reduce or shut off the supply of gas-making materials to the apparatus.

When the temperature by the thus provided increase of fuel has again been returned to a proper degree, the action of the motor 74 will cause the links 77 to be operated toward closure of the valve 78, when the pin 81, having fallen behind a shoulder 86, in the slot 82, will cause the links 83 to again open the valves 84—85. Upon sufficient opening of these valves, the pin 81 will strike a cam 87 to remove the pin 81 from behind the shoulder 86, and to restore the lost-motion device to its normal condition.

The materials for gas making are preferably fed from the pipes 18—19 into the pipes 21—22 through needle valves 88—89, whereby their respective flows may be finally controlled.

For emergency use, a by-pass 90 is provided about the needle valve 89, valves 91—92 providing for its use. Likewise, a by-pass 93 is provided about the needle valve 88, with controlling valves 94—95, and a by-pass 96 about the control valve 78 also having valves 97—98 for its control.

For the production of carbon black, an excess of hydrocarbon is fed to the apparatus and the temperatures therein are raised to the point of carbonization, whereupon the pressure of the superheated steam and disconnection of the conduit 39 permit continuous ejection of carbon black from the apparatus from conduit 39 or other desirable place.

It has been found that the process will operate successfully, though less efficiently with the catalyzer omitted. It is believed that under these conditions the steam is dissociated in contact with the hydrocarbon.

By utilization of the by-pass 90, the apparatus may be cleaned out, when necessary.

Careful analyses of the gas produced when the apparatus is controlled to that objective have shown that a considerable percentage of free oxygen accompanies the gas emerging the outlet 38, which gaseous mixture has herein been referred to as oxy-hydrocarbon gas, and which has been found very effective where high temperatures are wanted as in the steel industries, a considerable portion of the oxygen for combustion being thereby already present, thus rendering presence of nitrogen, which comes with air, necessary to a less extent.

Under certain manipulations of materials and temperatures, gases have been produced by the apparatus from which liquid hydrocarbon, in quantity from one to two and one-half gallons per one thousand cubic feet of gas, has been extracted by known processes. This liquid hydrocarbon has been found to contain various valuable by-products such as amylene, hexylene, benzol, toluene, xylene. The character of the gas, by proper manipulation of the apparatus, may be caused to show a B. t. u. value of wide variations and may be made rich or lean in illuminants and other gaseous elements and also by-products, as desired.

Because I employ constructive processes in contra-distinction to the prevailing destructive processes of gas manufacture in common use, I manufacture at small cost by the present invention a non-poisonous gas superior to natural gas and rich in valuable by-products, thereby and also because of utilization of generally waste materials contributing manifestly to conservation of energy and of natural resources.

Minor changes may be made in the physical embodiments of the apparatus and in the steps of the process without departing from the spirit of the invention.

I claim:

1. A method of producing gas, which comprises dissociating superheated steam into its chemical elements, transferring a portion of the heat of said dissociated elements to a hydrocarbon, mixing said elements with said hydrocarbon and supplying additional heat thereto to provide a hydrocarbon vapor mixed with said elements, producing an intimate mixture of said vapor and elements, raising the temperature of said mixture to the point of combination of the hydrogen derived from the steam with the hydrocarbon vapor to produce a mixture of permanent hydrocarbon gases and free oxygen, hydrogen and non-combustible gases of high specific gravity.

2. A method of producing gas, which comprises dissociating superheated steam into its chemical elements, then mixing said elements with hydrocarbon vapor, subjecting said mixture to alternate expansions and constrictions, and increase of heat to the temperature at which the hydrogen combines with the hydrocarbon vapor to produce a mixture of gases.

3. A method of producing gas, which comprises dissociating superheated steam into its chemical elements, then mixing said elements with hydrocarbon vapor, subjecting said mixture to alternate expansions and constrictions of volume being treated, and increase of heat to the temperature at which the hydrogen combines with the hydrocarbon vapor to produce a mixture of fixed gases, and removing the oxygen therefrom by absorption.

4. A method of producing gas, which comprises dissociating superheated steam into its chemical elements, then mixing said elements with hydrocarbon vapor, subjecting said mixture to alternate expansions and constrictions of volume treated and increase of heat to the temperature at which the hydrogen combines with the hydrocarbon vapor to produce a mixture of fixed gases, and removing the oxygen therefrom by absorption, and recovering the oxygen.

5. A method of producing gas, which comprises dissociating superheated steam into its chemical elements, applying a portion of the heat of said elements to hydrocarbon by conduction, then mixing the heated hydrogen and oxygen of such dissociation in heated condition with said heated hydrocarbon, allowing said mixture to expand and increasing the heat thereof, treating the resulting mixture of gases and vapor to a succession of expansions and constrictions of volume with increase of temperature to cause some of the hydrogen resulting from the decomposition of steam to be taken up by the hydrocarbon to form a mixture of permanent gases.

ORESTES U. BEAN.